US007965891B2

(12) United States Patent
Handley et al.

(10) Patent No.: US 7,965,891 B2
(45) Date of Patent: Jun. 21, 2011

(54) SYSTEM AND METHOD FOR IDENTIFYING AND LABELING FIELDS OF TEXT ASSOCIATED WITH SCANNED BUSINESS DOCUMENTS

(75) Inventors: John C. Handley, Fairport, NY (US); M. Armon Rahgozar, Penfield, NY (US); Dennis L. Venable, Marion, NY (US); Pamela B. Spiteri, Penfield, NY (US); Anoop M. Namboodiri, East Lansing, MI (US); Richard Zanibbi, Kingston (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/710,573

(22) Filed: Feb. 23, 2010

(65) Prior Publication Data
US 2010/0149606 A1    Jun. 17, 2010

Related U.S. Application Data

(62) Division of application No. 10/970,930, filed on Oct. 22, 2004, now Pat. No. 7,689,037.

(51) Int. Cl.
  *G06K 9/34* (2006.01)
(52) U.S. Cl. ............... 382/173; 382/176; 715/513
(58) Field of Classification Search ............ 382/100, 382/165, 173, 176, 190, 196, 209, 266
  See application file for complete search history.

(56) References Cited

U.S. PATENT DOCUMENTS

| | | | | |
|---|---|---|---|---|
| 3,654,611 A | * | 4/1972 | Bluethman et al. | 358/1.18 |
| 5,321,773 A | | 6/1994 | Kopec et al. | |
| 5,375,055 A | * | 12/1994 | Togher et al. | 705/37 |
| 5,438,512 A | * | 8/1995 | Mantha et al. | 715/234 |
| 5,526,444 A | | 6/1996 | Kopec et al. | |
| 5,530,794 A | * | 6/1996 | Luebbert | 715/210 |
| 5,625,465 A | * | 4/1997 | Lech et al. | 358/448 |
| 5,787,198 A | | 7/1998 | Agazzi et al. | |

(Continued)

OTHER PUBLICATIONS

Prosecution history between Mar. 10, 2010 and Sep. 24, 2010 of U.S. Appl. No. 12/710,568.

(Continued)

*Primary Examiner* — Wesley Tucker
*Assistant Examiner* — Aklilu k Woldemariam

(57) ABSTRACT

A system for electronically distilling information from a business document uses a network scanner to electronically scan a platen area, having a business document thereon, to create a bitmap. A network server carries out a segmentation process to segment the scan generated bitmap into a bitmap object, the bitmap object corresponding to the scanned business document; a bitmap to text conversion process to convert the bitmap object into a block of text; a semantic recognition process to generate a structured representation of semantic entities corresponding to the scanned business document; and a document generation process to convert the structured representation into a structure text file. The semantic recognition process includes the processes of generating, for each line of text having a keyword therein, a terminal symbol corresponding to the keyword therein; generating, for each line of text not having a keyword therein and absent of numeric characters, an alphabetic terminal symbol; generating, for each line of text not having a keyword therein and having a numeric character therein, an alphanumeric terminal symbol; generating a string of terminal symbols from the generated terminal symbols; determining a probable parsing of the generated string of terminal symbols; labeling each text line, according to a determined function, with non-terminal symbols; and parsing the business document information text into fields of business document information text based upon the non-terminal symbol of each text line and the determined probable parsing of the generated string of terminal symbols.

20 Claims, 9 Drawing Sheets

U.S. PATENT DOCUMENTS

| | | | |
|---|---|---|---|
| 5,841,900 | A | 11/1998 | Rahgozar et al. |
| 6,067,555 | A * | 5/2000 | Hayashi ................. 715/234 |
| 6,115,495 | A | 9/2000 | Tachikawa et al. |
| 6,181,820 | B1 | 1/2001 | Tachikawa et al. |
| 6,249,765 | B1 * | 6/2001 | Adler et al. ................. 704/500 |
| 6,342,901 | B1 * | 1/2002 | Adler et al. ................. 715/700 |
| 6,377,703 | B1 * | 4/2002 | Yeung ......................... 382/173 |
| 6,539,379 | B1 * | 3/2003 | Vora et al. ........................ 1/1 |
| 6,675,356 | B1 * | 1/2004 | Adler et al. ................. 715/200 |
| 6,704,456 | B1 | 3/2004 | Venable |
| 6,738,154 | B1 | 5/2004 | Venable |
| 6,832,350 | B1 * | 12/2004 | Bates et al. ................. 715/206 |
| 6,836,760 | B1 * | 12/2004 | Bellegarda et al. ........... 704/257 |
| 6,952,281 | B1 * | 10/2005 | Irons et al. ................. 358/1.15 |
| 7,035,821 | B1 * | 4/2006 | Smith et al. ..................... 705/39 |
| 7,370,045 | B2 * | 5/2008 | Vora et al. ..................... 717/106 |
| 7,519,903 | B2 * | 4/2009 | Yahagi ......................... 715/234 |
| 7,689,037 | B2 | 3/2010 | Handley et al. |
| 7,809,156 | B2 * | 10/2010 | Piersol et al. ................. 382/100 |
| 2002/0001393 | A1 * | 1/2002 | Jones et al. ................. 382/100 |
| 2002/0038319 | A1 * | 3/2002 | Yahagi ......................... 707/513 |
| 2004/0010757 | A1 * | 1/2004 | McCoy et al. ................. 715/530 |
| 2004/0044958 | A1 * | 3/2004 | Wolf et al. ................... 715/513 |
| 2004/0205449 | A1 * | 10/2004 | Hayes ......................... 715/500 |
| 2004/0205668 | A1 * | 10/2004 | Eastlake, III ................. 715/531 |
| 2004/0236741 | A1 * | 11/2004 | Burstrom et al. ................. 707/6 |
| 2006/0088214 | A1 | 4/2006 | Handley et al. |
| 2009/0119574 | A1 * | 5/2009 | Gitlin et al. ................... 715/209 |
| 2010/0150397 | A1 | 6/2010 | Handley et al. |

OTHER PUBLICATIONS

Bayer. T; Walischewski, H; Experiments on Extracting Structural Information from Paper Documents using Syntactic Pattern Analysis; IEEE 1995; pp. 476-479.

Bruckner, T.; Suda, P.; Block, H.; Maderlechner, G; In-house Mail Distribution by Automatic Address and Content Interpretation; SDAIR 1995; pp. 67-76.

Chang, F.; Retrieving Information from Document Images: Problems and Solutions; pp. 1-28, May 25, 2000.

Chiou, Y; Lee, H.; Recognition of Chinese Business Cards; IEEE 1997; pp. 1028-1032.

Dengel, A.; Bleisinger, R.; Fein, F.; Hoch, R.; Hones, F.; Malburg, M; Officemaid—A System for Office Mail Analysis, Interpretation and Delivery; pp. 52-73, Apr. 15-17, 1996.

He, J.; Downton, A.; User-Assisted Archive Document Image Analysis for Digital Library Construction: IEEE 2003.

Ishitani, Y; Document Transformation System from Papers to XML Data Based on Pivot XML Document Method, IEEE 2003.

Kanungo, T.; Mao, S.; Stochastic Language Model for Analyzing Document Pysical Layout; SPIE vol. 4670: 2002:pp. 28-36.

Kieninger, T.; Dengel, Al.; Applying the T-Recs Table Recognition System To The Business Letter Domain: IEE 2001: pp. 518-522.

Klink, S; Dengel, A; Kieninger, T.; Document Structure Analysis Based on Layout and Textual Features, 2000.

Kushmerick, N; Johnston, E.; McGuinness, S.; Information Extraction by Text Classification IJCAI 2001: pp. 1-7.

Liang, J;•Doermann, D.; Content Features for Logical Document Labeling; SPIE vol. 5010; 2003; pp. 189-196.

Lipshutz, M.; Taylor, S. Functional Decomposition of Business Letters; pp. 435-447.

Manning, C.; Schutze, H.; Foundations of Statistical Natural Language Processing; MIT Press:1999: pp. 381-405.

Pan, W; Jin, J.;Shi, G.; Wang, Q; A System for Automatic Chinese Business Card Recognition; IEEE 2001' pp. 577-581.

Shi, G; Pan, W; Jin, J.; Automatic Information Retrieval of Chinese Business Card; Proceedings of SPIE-IS&T Electronic Imaging, SPIE vol. 5010: 2003: pp. 241-248.

Walischewski, H.; Automated Knowledge Acquisition for Spatial Document Interpretation; ICDAR 1997; pp. 243-247.

Watanabe, T.; Huang, X; Automatic Acquisition of Layout Knowledge for Understanding Business Cards; IEEE 1997; pp. 216-220.

Zhenlong, B.; A General Approach to Informative Text Line Extraction for Document Analysis and Retrieval, 2001.

Prosecution history, as of Mar. 8, 2010 for U.S. Appl. No. 10/970,930.

Co-pending U.S. Appl. No. 12/710,568, filed Feb. 23, 2010.

Bayer, T; Walischewski, H; Experiments on Extracting Structural Information from Paper Documents using Syntactic Pattern Analysis; IEEE 1995; pp. 476-479.

Bodnar, A.; Jugoon, A.; Rose, A; Blostein, D.; A Grammatical Approach to Tagging Text on Business Cards; Queens's University, Kingston, Ontario, Canada.

Bruckner, T.; Suda, P.; Block, H.; Maderlechner, G.; In-house Mail Distribution by Automatic Address and Content Interpretation; SDAIR 1995; pp. 67-76.

Chang, F.; Retrieving Information from Document Images: Problems and Solutions; pp. 1-28.

Chiou, Y; Lee, H.; Recognition of Chinese Business cards; IEEE 1997; pp. 1028-1032.

Dengel, A.; Bleisinger, R.; Fein, F.; Hoch, R.; Hones, F.; Malburg, M.; Officemaid-A System for Office Mail Analysis, Interpretation and Delivery; pp. 52-73; Apr. 15-17, 1996.

* cited by examiner

1100

May 16, 1991

Mr. Craig Schub
Director of Development
PacifiCare Health Systems
5995 Plaza Drive
Cypress, CA 90630

Dear Craig:

Enclosed is one set of the new pages for the HMO National Network Sales Binder. As you can see, we have been busy expanding the Network to make it a better sales tool for your marketing representatives.

Please distribute these sets of materials to everyone at your HMO to whom you have given a Sales Binder.

We are working on a few more new pages that will be sent to you later this month. These pages are for Physicians Health Services of Connecticut and a map for ConnectiCare.

Please call me if you have any questions. I look forward to hearing from you and your sales/services reps.

Sincerely,

Ronald Rice
Executive Director

RR:hvy

Enclosures

DATELINE
May 16, 1991

INSIDE_ADDRESS
Mr. Craig Schub
Director of Development
PacifiCare Health Systems
5995 Plaze Drive
Cypress, CA 90630

OPENING
Dear Craig:

BODY_TEXT
Enclosed is one set of the new pages for the HMO National Network Sales Binder. As you can see, we have been busy expanding the Network to make it a better sales tool for your marketing representatives.

BODY_TEXT
Please distribute these sets of materials to everyone at your HMO to whom you have given a Sales Binder.

BODY_TEXT
We are working on a few more new pages that will be sent to you later this month. These pages are for Physicians Health Services of Connecticut and a map for ConnectiCare.

BODY_TEXT
Please call me if you have any questions. I look forward to hearing from you and your sales/services reps.

CLOSING
Sincerely,

SIGNOR
Ronald Rice
Executive Director

TAG_LINE
RR:hvy

TAG_LINE
Enclosures

*FIG. 8*

SYSTEM AND METHOD FOR IDENTIFYING AND LABELING FIELDS OF TEXT ASSOCIATED WITH SCANNED BUSINESS DOCUMENTS

PRIORITY INFORMATION

This application is a divisional application of co-pending U.S. patent application Ser. No. 10/970,930, filed on Oct. 22, 2004. This application claims priority, under 35 U.S.C. §120, from co-pending U.S. patent application Ser. No. 10/970,930, filed on Oct. 22, 2004. The entire content of U.S. patent application Ser. No. 10/970,930, filed on Oct. 22, 2004, is hereby incorporated by reference.

BACKGROUND

Conversion of paper documents to electronic form speeds and enhances many business processes. Business documents often contain identifying information that allows documents to be routed or stored properly and there is great value in extracting this information automatically from scanned document images.

Business processes in the office are facilitated by networks of computers and so-called multifunction devices. These devices incorporate printers, faxes, and scanners that, coupled with servers running the proper software, create functionality to convert paper documents to electronic and vice-versa. Furthermore, these networked devices can connect personal digital assistants, cell phones, and other handheld devices. It is therefore important and valuable to extract business information in a networked environment to store and display it where is it most useful.

Exchanging business cards is a tradition business practice for people to convey important information. The printed information on a business card may include a combination of identification and/or contact information; such as name, address, phone number, and/or email address; and non-important business information; such as logos, graphics, annotations, and/or slogans. Notwithstanding the fact that the cards contain both types of information, a business card is still considered a critical vehicle to conveying the information needed in establishing and/or maintaining business relationships.

With the advent of digital devices such as personal digital assistants, electronic address books, or personal computers, the converting of the printed information on the business card to an electronic format has become a necessary business tool. The conventional tools, scanned business card recognition system, often used to import the printed information to digital devices are labor-intensive and prone to error.

In conventional scanned business card recognition systems, once the printed text on a business card has been recognized by optical character recognition software, the text gets labeled according to one or more functions, e.g., email, name, organization, address, etc. Business card fields are often labeled using lexicographical information wherein text comprising names is identified using a dictionary and wherein text comprising organizations is identified using a dictionary of organizations, etc.

Another conventional method for converting of the printed information on the business card to an electronic format acquires the layout knowledge of business cards. The conventional method generates the layout knowledge of business cards from a predefined logical structure. However, in most cases, the conventional method cannot readily determine the physical relationships (or layout) among the items in a card because of the great variety in the physical layout of today's business cards.

Although conventional scanned business card recognition systems provide a variety of methodologies to convert the printed information on the business card to an electronic format, such systems are labor-intensive and prone to error. Such systems are limited by the dictionaries or pre-defined information repositories used to identify the text information or are limited in identifying the text because of the great variety in the physical layout of today's business cards.

Lastly, the various conventional methodologies of business card recognition convert the information into proprietary formats that are not easily transferable to other contact management systems. These conventional systems are also tethered to a particular electronic device such that business card cannot be readily process on business card recognition dependent devices and then transferred in a format that is universally acceptable to the user's desired device.

Business letters form another class of critical documents. Owing to the expense of paper handling, many businesses seek to eliminate paper workflows by scanning mail as soon as it is delivered to the mailroom. As with business cards, these are semi-structured documents where identifying information such as names, address, email addresses, telephone numbers, and the like appear in variable places within the document.

In a mailroom operations, many businesses, such as banks, attempt to "truncate the paper" by scanning documents as they enter the business and route them electronically. This is faster and cheaper than using hardcopy. To route efficiently, it is required that field of business letters be recognized and labeled. In particular, one usually requires the recipient and sender. The recipient's email address is looked up in a database and the scanned document is sent. Current optical character recognition (OCR) systems do not provide this high level structure from a scanned document.

Therefore, it is desirable to provide a business card recognition system that is automated and substantially error free. Moreover, it is desirable to provide a business card recognition system that converts the information into a format that is easily transferable to conventional contact management systems. Furthermore, it is desirable to provide a business card recognition system that is not tethered to a particular electronic device such that business card can be readily process on business card recognition independent devices and then transferred in a format that is universally acceptable to the user's desired device.

Therefore, it is desirable to provide a business letter recognition system that is automated and substantially error free. Moreover, it is desirable to provide a business letter recognition system that converts the information on a business letter into a format that is easily used to route the scanned version of the business letter to its rightful destination. Furthermore, it is desirable to provide a business letter recognition system that is not tethered to a particular electronic device such that business letter can be readily process on business letter recognition independent devices and then the electronic version of the business letter can be readily transferred or routed to its proper destination based upon the information from business letter recognition system.

Therefore, it is further desirable to provide a system and method that uses a multifunction device to scan a business letter to a repository; processes the business letter with an optical character recognition system; uses the provided layout information to segment the recognized lines of text into a linear sequence of regions and separators; identifies tokens for each line using classifiers; and for each separator, parses the token sequence into "non-terminal" symbols comprising region labels and uses the recipient field to route the scanned document.

A method distills information from a hard copy business card to generate a structured electronic file having the distilled information therein. The method electronically scans a platen area of a network citizen, having a business card thereon, to create a bitmap of the scanned platen area; transfers the bitmap of the scanned platen area to a network processor; segments the bitmap of the scanned platen area, using the network processor, into a bitmap object, the bitmap object corresponding to the scanned business card; converts, using the network processor, the bitmap object into a block of text; processes, using the network processor, the block of text to generate a structured representation of semantic entities corresponding to the scanned business card; and converts, using the network processor, the structured representation into a structure text file.

A system distills information from a hard copy business card to generate a structured electronic file having the distilled information therein. The system includes a network citizen having a platen area, said network citizen electronically scanning the platen area, having a business card thereon, to create a bitmap of the scanned platen area and a network processor, operatively connected to the network citizen, the network processor segmenting the bitmap of the scanned platen area, received from the network citizen, into a bitmap object, the bitmap object corresponding to the scanned business card. The network processor converts the bitmap object into a block of text and processing the block of text to generate a structured representation of semantic entities corresponding to the scanned business card. The network processor converts the structured representation into a structure text file.

A system retrieves information from a hard copy business card to generate a structured electronic file having the retrieved information therein. The system includes a network scanning means, having a platen area, for electronically scanning the platen area, having a business card thereon, to create a bitmap of the scanned platen area and a network server, operatively connected to the network scanning means. The network server includes segmentation means for segmenting the bitmap of the scanned platen area, received from the network scanning means, into a bitmap object, the bitmap object corresponding to the scanned business card; bitmap to text converter means, operatively connected to the segmentation means, for converting the bitmap object into a block of text; semantic means, operatively connected to the bitmap to text converter means, for processing the block of text to generate a structured representation of semantic entities corresponding to the scanned business card; and card generation means, operatively connected to the bitmap to text converter means, for converting the structured representation into a structure text file.

A method parses business card information text from electronically derived text representing an electronically scanned business card. The method orders lines of text linearly left-to-right, top-to-bottom; generates, for each line of text having a keyword therein, a terminal symbol corresponding to the keyword therein, the terminal symbol being a member of a pre-defined set of terminal symbols; generates, for each line of text not having a keyword therein and absent of numeric characters, an alphabetic terminal symbol; generates, for each line of text not having a keyword therein and having a numeric character therein, an alphanumeric terminal symbol; generates a string of terminal symbols from the generated terminal symbols; determines a probable parsing of the generated string of terminal symbols; labels each text line, according to a determined function, with non-terminal symbols; and parses the business card information text into fields of business card information text based upon the non-terminal symbol of each text line and the determined probable parsing of the generated string of terminal symbols.

A method distills information from a hard copy business document to determine routing information for forwarding of an electronic version of business document to a destination. The method electronically scans a platen area of a digital scanner, having a business document thereon, to create a bitmap of the scanned platen area; converts the bitmap object into a block of data, the block of data including lines of text, position information, text size information, and line separators; segments the block of data into text lines, separators, and region objects; assigns a lexical type to the segmented text lines based upon a predetermined set of regular expressions; identifies, within the block of data, recipient information, using the assigned lexical type information and a stochastic context-free grammar model; determines routing information corresponding to a destination associated with the identified recipient information; and forwards the electronic version of the scanned business document to the destination.

A method distills information from a hard copy business document to determine routing information for forwarding of an electronic version of business document to a destination. The method electronically scans a platen area of a digital scanner, having a business document thereon, to create a bitmap of the scanned platen area; converts the bitmap object into a block of data, the block of data including lines of text, position information, text size information, and line separators; segments the block of data into text lines, separators, and region objects; assigns a lexical type to the segmented text lines based upon a predetermined set of regular expressions; identifies, within the block of data, recipient information, using the assigned lexical type information and a stochastic context-free grammar model; orders, within the block of sender information, lines of text linearly left-to-right, top-to-bottom; generates, for each line of text having a keyword therein, a terminal symbol corresponding to the keyword therein, the terminal symbol being a member of a pre-defined set of terminal symbols; generates, for each line of text not having a keyword therein and absent of numeric characters, an alphabetic terminal symbol; generates, for each line of text not having a keyword therein and having a numeric character therein, an alphanumeric terminal symbol; generates a string of terminal symbols from the generated terminal symbols; determines a probable parsing of the generated string of terminal symbols; labels each text line, according to a determined function, with non-terminal symbols; parses the text into fields of business card information text based upon the non-terminal symbol of each text line and the determined probable parsing of the generated string of terminal symbols; processes the parsed text to generate a structured representation of semantic entities; converts the structured representation into a structure text file; determines routing information corresponding to a destination associated with the identified recipient information; forwards the structure text file to the destination.

A method distills information from an electronic business document to determine routing information for forwarding of the electronic version of business document to a destination. The method parses a rich text format document into lines of text, position information, text size information, and line separators; segments the parsed rich text format document into text lines, separators, and region objects; assigns a lexical type to the segmented text lines based upon a predetermined set of regular expressions; identifies, within the block of data, recipient information, using the assigned lexical type information and a stochastic context-free grammar model; determines routing information corresponding to a destination associated with the identified recipient information; and forwards the electronic version of the scanned business document to the destination.

A system distills information from a hard copy business document to determine routing information for forwarding of an electronic version of business document to a destination associated with an addressee of the hard copy business document. The system includes a digital network scanner to electronically scan a platen area, having a business document thereon, to create a bitmap of the scanned platen area and a network server operatively connected to the digital network scanner. The network server converts the bitmap object into a block of data, the block of data including lines of text, position information, text size information, and line separators and segments the block of data into text lines, separators, and region objects. The network server assigns a lexical type to the segmented text lines based upon a predetermined set of regular expressions and identifies, within the block of data, addressee information, using the assigned lexical type information and a stochastic context-free grammar model. The network server determines routing information corresponding to a destination associated with the identified addressee information and forwards the electronic version of the scanned business document to the destination associated with an addressee of the hard copy business document.

A system distills information from an electronic business document to determine routing information for forwarding of the electronic version of business document to a destination associated with an addressor and addressee of the electronic business document. The system includes a network connected document processing device to generate an electronic business document and a network server operatively connected to the network connected document processing device. The network server parses a rich text format document into lines of text, position information, text size information, and line separators and segments the parsed rich text format document into text lines, separators, and region objects. The network server assigns a lexical type to the segmented text lines based upon a predetermined set of regular expressions and identifies, within the block of data, addressor and addressee information, using the assigned lexical type information and a stochastic context-free grammar model. The network server determining routing information corresponding to a destination associated with the identified addressor and addressee information and forwards the electronic version of the scanned business document to the destination.

Networked multifunction devices and computers scan business letters and their attachments, process the scanned images with optical character recognition to extract lines of text, their positions, and font sizes, apply regular expression matching to assign tokens to the lines of text, apply stochastic-context-free grammar technology to extract names, addresses, email addresses and the like, and route the documents electronically to the intended recipient via email. Optical character recognition can occur on the scanner itself or on a connected computer. Similarly, the extraction functionality can reside on the scanning device or on a connected computer.

BRIEF DESCRIPTION OF THE DRAWINGS

The drawings are only for purposes of illustrating embodiments and are not to be construed as limiting, wherein:

FIG. 7 illustrates a typical business letter;

FIG. 8 illustrates the recognized fields of the business letter of FIG. 6.

DETAILED DESCRIPTION

Figure 1:
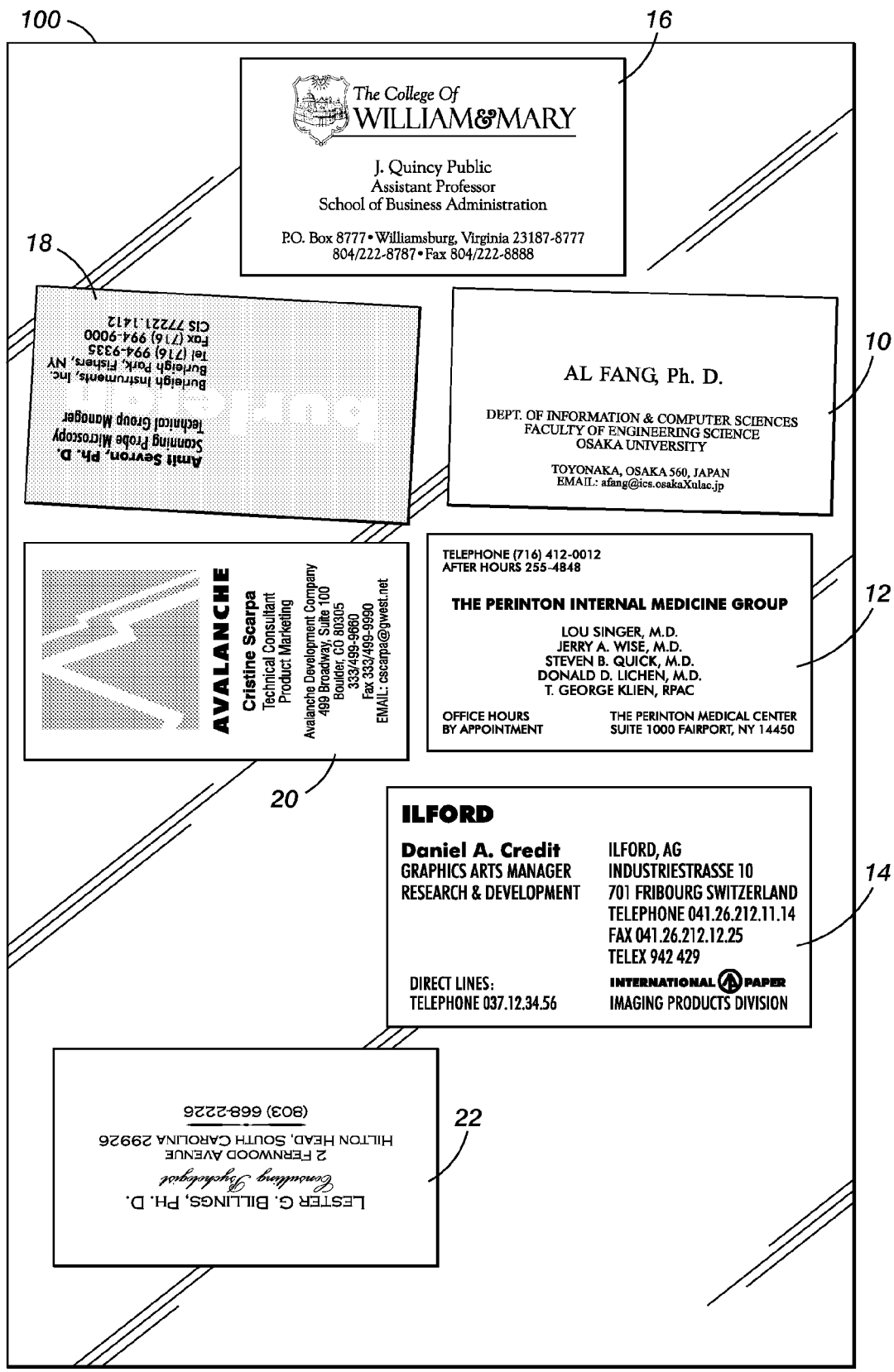
FIG. 1 illustrates a plurality of business cards located upon a platen area of a scanner.

For a general understanding, reference is made to the drawings. In the drawings, like reference have been used throughout to designate identical or equivalent elements. It is also noted that the various drawings are not drawn to scale and that certain regions have been purposely drawn disproportionately so that the features and concepts could be properly illustrated.

As noted above, a business document recognition system is automated, substantially error free, and is not tethered to a particular electronic device such that business documents can be readily processed on business document recognition dependent devices and then transferred in a format that is universally acceptable to the user's desired device. More specifically, the problem of converting printed data on a business document to an electronic format which can be made available for loading into a storage device or a user's personal digital assistant/computing/communication device/storage device is addressed.

A business card recognition system is also automated, substantially error free, and is not tethered to a particular electronic device such that business card can be readily process on business card recognition dependent devices and then transferred in a format that is universally acceptable to the user's desired device. More specifically, the problem of converting printed data on a business card to an electronic format which can be made available for loading into a storage device or a user's personal digital assistant/computing/communication device is addressed.

A system scans one or more business cards that have been placed on a platen of a digital scanner. As illustrated in FIG. 1, a platen 100 of a digital scanner contains thereon a plurality of business cards (10, 12, 14, 16, 18, 20, and 22) in preparation for digital scanning. The business cards (10, 12, 14, 16, 18, 20, and 22) may be placed in any orientation on the platen 100 because each business card (10, 12, 14, 16, 18, 20, and 22) will be segmented so as to create separate records of information, as will be discussed in more detail below. The platen 100, with the business cards (10, 12, 14, 16, 18, 20, and 22) thereon, is scanned to generate a digital bitmap representing the scanned platen area.

The digital bitmap may be sent to a network server, assuming that the digital scanner is a network citizen. The digital scanner may be part of a multi-function device that has a processor capable of performing the various functions that will be discussed below to convert the bitmap to useable text data and to parse out this text data into coherent and meaningful fields.

Figure 2:
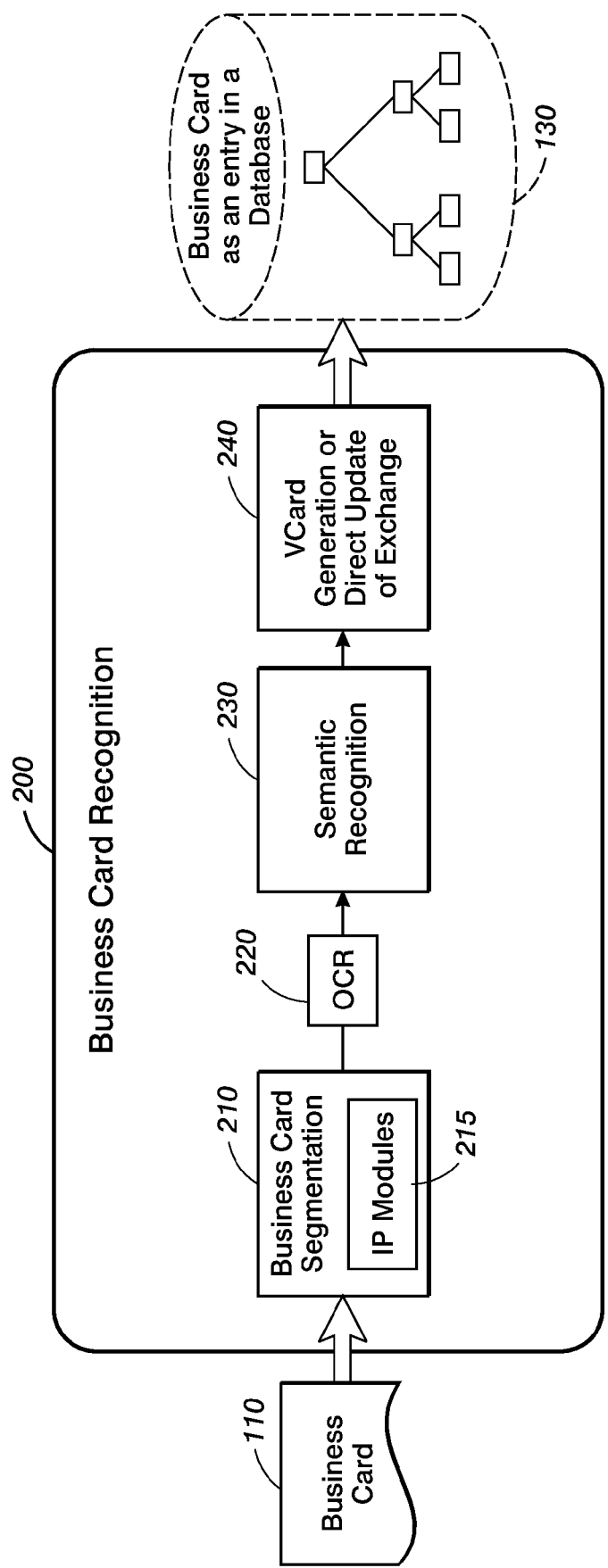
FIG. 2 is a block diagram of a business card recognition system.

As illustrated in FIG. 2, the digital bitmap 110 is received by a business card recognition system or processor 200. The business card recognition system or processor 200 includes a business card segmentation subsystem or module 210 that segments or parses out each individual business card from the overall digital bitmap 110 into individual business card digital bitmaps. The business card segmentation subsystem or module 210 may include an image processing module 215 to process the bitmap. Examples of such processes are anti-aliasing, edge enhancement, deskewing, etc.

The business card segmentation subsystem or module 210 receives the digital bitmap 110 generated by scanning the digital scanner platen 100 and automatically identifies at least the position, shape and orientation angle of each object, business cards (10, 12, 14, 16, 18, 20, and 22). Initially, the object(s), business cards (10, 12, 14, 16, 18, 20, and 22), within the image 110 is located and boundaries of the object(s), business cards (10, 12, 14, 16, 18, 20, and 22), are generally identified. Once the object(s), business cards (10, 12, 14, 16, 18, 20, and 22), is/are located, the shape of the object is modeled. Having located the object and modeled its shape, a structured image, or similar digital document format representing the image and the object therein can be created. The structured image may include data representing not only the image data itself, but data representing the location, shape, or orientation of the object, or some combination thereof.

The object's location is realized by first identifying the background region of the input image 110, characterizing the background region, and then using the characteristic of the background region as a seed, identifying all the pixels representing the background region with an adaptive seed fill algorithm. Background pixels are pixels not associated with any objects, business cards (10, 12, 14, 16, 18, 20, and 22), or more simply, background pixels are pixels representative of those regions lying outside of the objects, business cards (10, 12, 14, 16, 18, 20, and 22), the values of which are controlled by the "background" against which the objects are placed during scanning (e.g., the underside of the platen cover).

Having identified background pixels and created a representation of the object boundaries, noisy edges can be optionally smoothed, by the IP module 215, using, for example, morphological filtering.

Once the object has been located, the next general step is to model the shape of the object. For purposes of simplicity, the following description will treat rectangular-shaped objects, however, it will be appreciated that the description is extensible to other polygons and even to shapes having portions thereof represented by curves (e.g., circular or elliptical objects).

The location of the object is a set of bounding pixels or a set of edge traces may be organized in the form of a linked list. These pixels or traces can be used to extract the object, but orientation is not yet determined. To improve the quality of the object extraction, the object traces are fitted to a model shape. Orientation information and other characteristics of the object may then be extracted from the fitted parameters.

A more detailed discussion of the business card segmentation process is set forth in U.S. Pat. No. 6,704,456, entitled "Automatic Image Segmentation In The Presence Of Severe Background Bleeding." The entire content of U.S. Pat. No. 6,704,456 is hereby incorporated by reference.

Another discussion of an object segmentation process that may be readily used is set forth in U.S. Pat. No. 6,738,154, entitled "Locating the Position and Orientation of Multiple Objects with a Smart Platen." The entire content of U.S. Pat. No. 6,738,154 is hereby incorporated by reference.

After each object, business cards (10, 12, 14, 16, 18, 20, and 22), has been extracted, each individual business card object, business card bitmap, is processed by a optical character recognition process in optical character recognition subsystem or module 220. The optical character recognition process may be any conventional optical character recognition process. The optical character recognition process performed by the optical character recognition subsystem or module 220 converts each business card bitmap into a business card record of text data.

The business card record of text data is subsequently processed by a semantic recognition subsystem or module 230. The actual semantic recognition process will be discussed in more detail below. The semantic recognition subsystem or module 230 outputs a plurality of fields of text data with labels to identify the nature of the text data within the fields, the labels being, for example, name, title, organization name, address, phone number, etc.

The labeled fields of text data are received by an electronic business card generation subsystem or module 240. The electronic business card generation subsystem or module 240 converts the labeled fields of text data into a text file that can be readily used by various business contact management applications to import the desired business information in a useable format. For example, the electronic business card generation subsystem or module 240 may generate a text file that can be imported into a conventional e-mail application or electronic address book.

Thereafter, the text file can be e-mailed to the user for importing into the user's appropriate applications or databases or electronically transferred to a database 130 residing on the network.

In summary, the scanned images may be routed to a network server where the scanned image is segmented into the images of individual business cards. Each scanned business card is then run through an application which interprets its contents, i.e. determines what's name, what's email, etc. The interpreted entities are then used to create text file for use in a conventional contact management application or electronic address book. Examples of such text file may have a vcf or rix extension. The text file can be then e-mailed to the user to be automatically saved as an electronic entity using the normal process of a conventional email client.

A user meets a set of potential customers in a sales show and obtains their business cards. The user does not want to enter the information on the business cards into the user's handheld's contact list or address book manually; as it just takes too much time. The user can place the business cards onto the platen of a digital scanner and selects a scanning task related to generating text files from the scanned bitmap and e-mailing the text files to a selected address. The user upon selecting this task, entering the proper e-mail address, and hitting a start button enables the automatic conversion of the information upon the business cards into text files that can be forwarded to the user.

In one scenario, the user receives an email note on his handheld or his laptop or personal computer. The subject line of the e-mail may read: "Your New Contacts." Once the user opens the e-mail, the user notices a set of attachments (text files), one corresponding to each individual whose business card the user scanned. The user can now choose to accept each of the attachments into his contact list.

In another scenario, the user receives an e-mail note on his handheld. The subject line of the email may read: "Your New Contacts have been added to your Exchange Contact List." Unlike the scenario above, there are no attachments in this e-mail note because the text files have already been automatically added to a predetermined database of contact information.

As noted above, the layout of a business card is modeled. The layout of a business card may be modeled as a stochastic context-free grammar where terminal symbols correspond to lines of text with font size information and separators. Non-terminals are labels for the functions of the text, e.g., names, organizations, etc. Using the output of an optical character recognition process, the most probable parse of the lines is produced, thereby labeling lines of text with their function. As example of this process is illustrated by FIG. 3.

Figure 3:
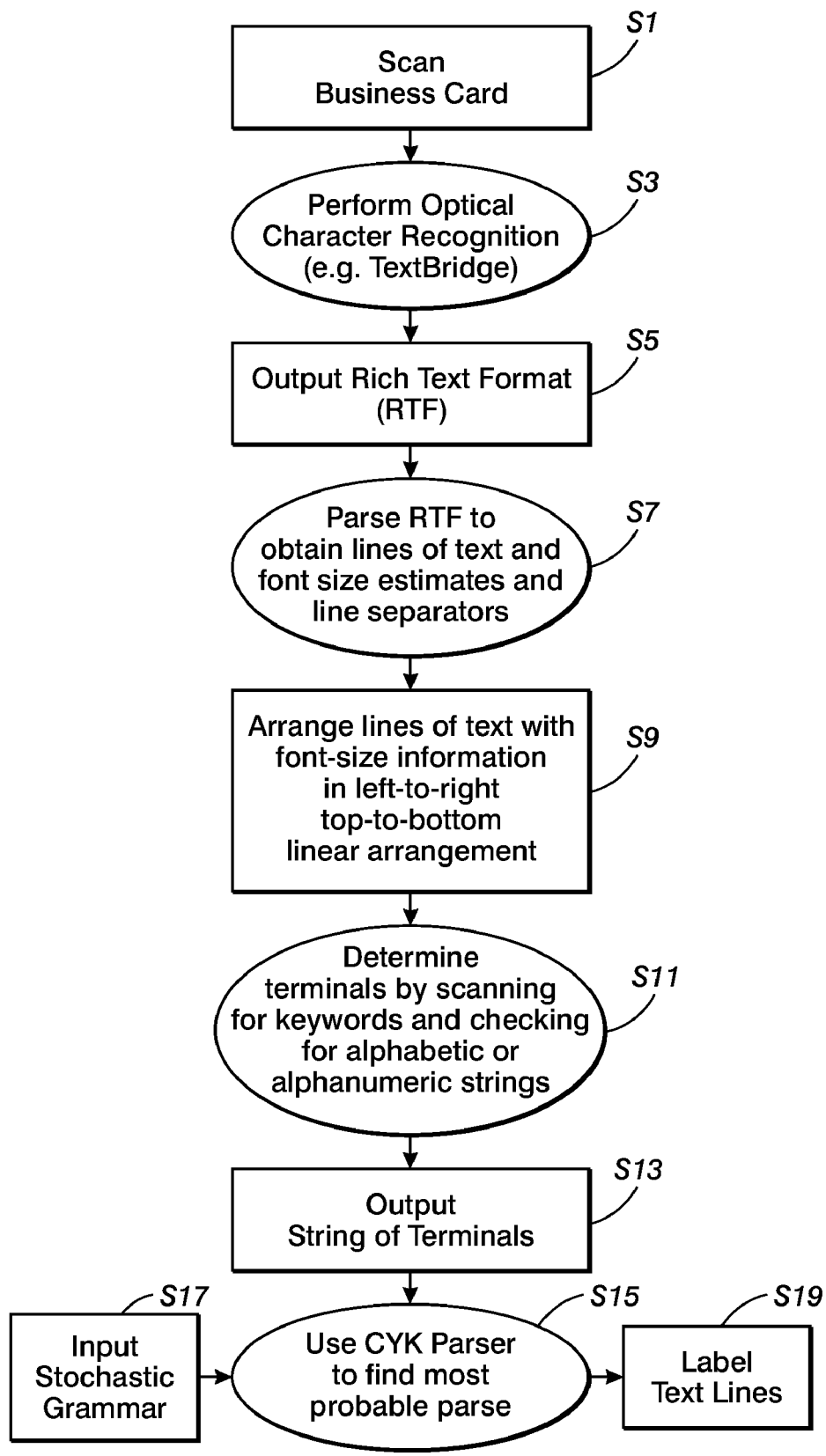
FIG. 3 illustrates a flowchart for recognizing the contents of a business card.

In FIG. 3, a business card or a plurality of business cards are scanned at step S1. Thereafter, optical character recognition is performed, at step S3, upon the scanned image to output, at step S5, layout information in a rich text file format (including font size estimates). The rich text file format is parsed to obtain lines of text, font size estimates, and line separators, at step S7. At step S9, the text lines of the optical character recognition output are ordered linearly left-to-right, top-to-bottom. The lines of text are scanned, at step S11, for keywords such as "email," "fax," "url," etc. to find obvious labeled terminals; otherwise the remaining terminals are labeled as either "a_line" (alphabetic line) or "an_line" (alphanumeric line (contains at least one number). From this determination, a string of terminals are generated at step S13.

A Cocke-Younger-Kasami (CYK) algorithm, at step S15, is used with a stochastic grammar algorithm, at step S17, to find the most probable parse (derivation) of the sequence of terminals. The CYK algorithm determines whether a given string can be generated by a given stochastic context-free grammar and, if so, how it can be generated. This is known as parsing the string.

A typical CYK algorithm for the membership problem is as follows:

---
Let the input string be a sequence of n letters $a_1 \ldots a_n$.
Let the grammar contain r terminal and non-terminal symbols $R_1 \ldots R_r$, and let $R_1$ be the start symbol.
Let P[n,n,r] be an array of booleans.
Initialize all elements of P to false.
For each i = 1 to n
For each unit production $R_j \rightarrow a_i$, set P[i,1,j] = true.
For each i = 2 to n -- Length of span
For each j = 1 to n-i+1 -- Start of span
For each k = 1 to i-1 -- Partition of span
For each production $R_A \rightarrow R_B R_C$
If P[j,k,B] and P[j+k,i-k,C] then set P[j,i,A] = true
If P[1,n,1] is true
Then string is member of language
Else string is not member of language
---

In informal terms, this algorithm considers every possible consecutive subsequence of the sequence of letters and sets P[i,j,k] to be true if the sequence of letters starting from i of length j can be generated from $R_k$. Once it has considered sequences of length 1, it goes on to sequences of length 2, and so on. For subsequences of length 2 and greater, it considers every possible partition of the subsequence into two halves, and checks to see if there is some production P→QR such that Q matches the first half and R matches the second half. If so, it records P as matching the whole subsequence. Once this process is completed, the sentence is recognized by the grammar if the subsequence containing the entire string is matched by the start symbol.

It is simple to extend the above algorithm to not only determine if a sentence is in a language, but to also construct a parse tree, by storing parse tree nodes as elements of the array, instead of Booleans. Since the grammars being recognized can be ambiguous, it is necessary to store a list of nodes.

Lastly, non-terminals are used to label the text lines according to their function (name, organization, etc.), at step S19.

It is noted that a grammar must be established which defines a set of terminal symbols that could appear in a business card. Each terminal in the grammar represents a single line of text from the card.

The lines may be labeled, for example, by one of the following terminal labels (a_line, an_line, emph_line, huge_line, office_line, fax_line, mobile_line, pager_line, other_line, email_line, and url_line) according to the line's content as illustrated in Table 1.

TABLE 1

| Terminal Label | Contents |
| --- | --- |
| a_line | alphabetic line |
| an_line | alpha-numeric line |
| emph_line | large-font or bold lines |
| huge_line | huge font-line |
| office_line | line with office/main phone number |
| fax_line | line with fax number |
| mobile_line | line with mobile phone number |
| pager_line | line with pager number |
| other_line | line with any other phone number |
| email_line | line with an email address |
| url_line | line with a url |

In addition, a terminal separator is used between two lines which are spatially apart or which belong to different labels. A terminal epsilon (eps) or null symbol can also be used to help simplify the grammar. Examples of non-terminal labels (NAME_AFFILIATION, ID_BLOCK, ORG_NAME, ORG_BLOCK, ADDRESS_BLOCK, PHONE_BLOCK, INTERNET_BLOCK, COMMENT_BLOCK, etc., are used to represent various regions of a card, as illustrated in Table 2. Other non-terminals can further abstract multiple terminals into a single group.

TABLE 2

| Non-terminal Label | Contents |
| --- | --- |
| (NAME_AFFILIATION, ID_BLOCK) | Name and title of the person |
| (ORG_NAME, ORG_BLOCK) | Name of the organization |
| (ADDRESS_BLOCK) | Address of the person/office |
| (PHONE_BLOCK) | Phone numbers |
| (EMAIL_BLOCK) | Email address |
| (URL_BLOCK) | Internet URL address |
| (COMMENT_BLOCK) | Lines not fitting the other non-terminals |

The grammar rules are directed by two important, but conflicting objectives. First, simplicity of the grammar helps reduce the number of parameters or probabilities to be estimated. Second, involves the ability of the grammar to model spatial order of the different regions of interest such as name, address and organization name. Even though it is possible to describe a two-dimensional spatial distribution using stochastic context-free grammars, the business cards may be modeled as a linear sequence of regions.

The blocks in a card may be ordered linearly by scanning them from left to right; top to bottom. It is noted that it may not be practical to use a grammar that generates each of the individual orderings as there may be thousands to estimate.

Orderings may be simplified as follows. Every business card is assumed to contain a single ID_BLOCK and a single ADDRESS_BLOCK. Three sets of blocks are additionally defined by their position on the business card relative to the ID_BLOCK and ADDRESS_BLOCK.

Blocks found to occur prior to the location of both the ID_BLOCK and the ADDRESS_BLOCK are called S_BLOCKS (start blocks). Blocks, which are found to occur in between location of the ID_BLOCK and the ADDRESS_BLOCK, are called M_BLOCKS (middle blocks). Blocks, which are found to occur after both the ID_BLOCK and the ADDRESS_BLOCK, are called E_BLOCKS (end blocks).

Further, the grammar may also model the probability that each block; such as: COMMENT_BLOCK, PHONE_BLOCK, etc.; belongs to one of: S_BLOCKS, M_BLOCKS, or E_BLOCKS. It also considers the two possible orderings of ID_BLOCK and ADDRESS_BLOCK.

The following list contains a list of possible rules for a grammar. It is noted that terminal symbols are named using lower-case alphabets and non-terminal symbols are named using upper-case. The number preceding each production denotes the probability of the production being applied in the derivation of a terminal string when the non-terminal on the left hand side is encountered.

0.80 CARD -> S_BLOCKS separator ID BLOCK M_BLOCKS separator ADDRESS_BLOCK E_BLOCKS
0.20 CARD -> S_BLOCKS separator ADDRESS BLOCK M_BLOCKS separator ID_BLOCK E_BLOCKS
0.66 S_BLOCKS -> separator S_BLOCK S_BLOCKS
0.34 S_BLOCKS -> eps
0.40 S_BLOCK -> ORG BLOCK
0.25 S_BLOCK -> PHONE BLOCK
0.25 S_BLOCK -> INTERNET BLOCK
0.10 S_BLOCK -> COMMENT BLOCK
0.20 M_BLOCKS -> separator M_BLOCK M_BLOCKS
0.80 M_BLOCKS -> eps
0.10 M_BLOCK -> ORG BLOCK
0.35 M_BLOCK -> PHONE BLOCK
0.35 M_BLOCK -> INTERNET BLOCK
0.20 M_BLOCK -> COMMENT BLOCK
0.60 E_BLOCKS -> separator E_BLOCK E_BLOCKS
0.40 E_BLOCKS -> eps
0.10 E_BLOCK -> ORG BLOCK
0.40 E_BLOCK -> PHONE BLOCK
0.40 E_BLOCK -> INTERNET BLOCK
0.10 E_BLOCK -> COMMENT_BLOCK
0.30 ID_BLOCK -> NAME
0.70 ID_BLOCK -> NAME AFFILIATION
0.35 ADDRESS_BLOCK -> ADDRESS NAME ADDRESS_BLOCK
0.35 ADDRESS_BLOCK -> an_line ADDRESS_BLOCK
0.15 ADDRESS_BLOCK -> an_line
0.15 ADDRESS_BLOCK -> a_line
0.50 ADDRESS_NAME -> emph_line
0.50 ADDRESS_NAME -> a_line
0.80 ORG_NAME -> huge_line
0.20 ORG_NAME -> emph_line
0.40 ORG_BLOCK -> ORG_NAME
0.20 ORG_BLOCK -> ORG_NAME ORG_NAME
0.20 ORG_BLOCK -> ORG_NAME ORG_NAME ORG_NAME
0.20 ORG_BLOCK -> ORG_NAME A_LINES
0.50 PHONE_BLOCK -> PHONE_LINE PHONE_BLOCK
0.50 PHONE_BLOCK -> PHONE_LINE
0.25 PHONE_LINE -> office_line
0.25 PHONE_LINE -> fax_line
0.20 PHONE_LINE -> mobile_line
0.20 PHONE_LINE -> other_line
0.10 PHONE_LINE -> pager_line
0.30 INTERNET_BLOCK -> email_url
0.30 INTERNET_BLOCK -> url_email -continued 0.30 INTERNET_BLOCK -> email
0.10 INTERNET_BLOCK -> url
1.00 NAME -> emph_line
1.00 AFFILIATION -> A_LINES
0.60 A_LINES -> a_line A_LINES
0.40 A_LINES -> a_line
0.65 COMMENT_BLOCK -> a_line
0.15 COMMENT_BLOCK -> an_line
0.10 COMMENT_BLOCK -> COMMENT_BLOCK a_line
0.10 COMMENT_BLOCK -> COMMENT_BLOCK an_line The font size of each of the characters is estimated and this information is made available in a data structure. The font size information is converted to terminal symbols such as: a_line, emph_line, and huge_line. It can be difficult to classify text of a particular size as either an emph_line or a huge_line so a probability distribution of font sizes, corresponding to each of: a_line, emph_line, and huge_line, is used.

To cope with the variability in font sizes across differing business cards, font sizes within each card can be normalized to have a value ranging between 0 and 1. As such, each of a_line, emph_line, and hugh_line assume a Gaussian distribution in this range. These probabilities are then incorporated into the computation of the most probable parse using the CYK algorithm. The probability of a non-terminal deriving a particular terminal symbol of a specific font-size in the input string is the product of the probabilities P of the non-terminal deriving the terminal symbol and that of the terminal symbol having the font-size observed. This can be represented as:

$$P(NT \rightarrow T_{fs}) = P(NT \rightarrow T) * P(fs/T)$$

where $T_{fs}$ is a terminal symbol of font-size fs and NT is a non-terminal. The CYK algorithm computes the maximum probability of $P(NT \rightarrow Tfs)$ over all T.

In summary, a networked scanner connected to a computer server executes processes to segment the images of the business cards into individual cards, processes each card with an optical character recognition system that outputs characters in the form of line with positions font sizes, a process that produces lines of text with attributes according to stochastic context-free grammar, a parsing system that assigns non-terminal labels to blocks of lines, and a module that converts non-terminal labels to a database entry.

As noted above, in mailroom operations, many businesses have attempted to "truncate the paper" by scanning documents as the documents enter the business and route them electronically. This is faster and cheaper than routing hardcopy documents. To route efficiently, it is required that field of business letters be recognized and labeled. In particular, one usually requires the recipient (addressee) and sender (addressor) information to be known so that the recipient's email address can be looked up in a database and the scanned document is sent. Currently, this process of acquiring the recipient (addressee) and sender (addressor) information and e-mailing the scanned document is done manually.

For example, a multifunction device may scan a business letter to a repository, process the business letter with an optical character recognition system, use the provided layout information to segment the recognized lines of text into a linear sequence of regions and separators, identify tokens for each line using classifiers and for each separator, parsing the token sequence into "non-terminal" symbols comprising region labels, using the recipient field to route the scanned document. The actual details of this process will be described in more detail below with respect to FIGS. 4 and 5.

As noted above, in many business workflow environments, it is cheaper and faster to process electronic documents. Paper documents are eliminated at the mailroom by scanning mail and routing the scanned image to the recipient by email. In addition to scanning a document to get the raw image, it is necessary to extract "metadata" associated with the document. For business letters, appropriate metadata includes recipient and sender. Also, the body of letter may be useful to summarize the content of the letter.

After an individual scans a business letter, the region-labeled text of the letter is sent electronically to a desired destination (e.g. as email, or to a remote disk). The optical character recognition output and recognized metadata (region types) can be then used for automated indexing and retrieval of letters, routing, and in producing editable electronic versions of the original document.

In a general sense, the user scans a business letter at a multifunction device; deposits the scanned image in a file system; processes the image with an optical character recognition process; outputs ASCII text and layout information; labels the data according to a document model instantiated as a stochastic context-free grammar; and processes the labeled data for routing, storing, or extraction routines. Regions of a business letter may be classified based on the text content and spatial layout of text lines. The regions may be modeled using probabilistic classification of text lines and stochastic context-free grammar modeling of region sequencing, similar to the business card recognition routines described above.

Figure 4:
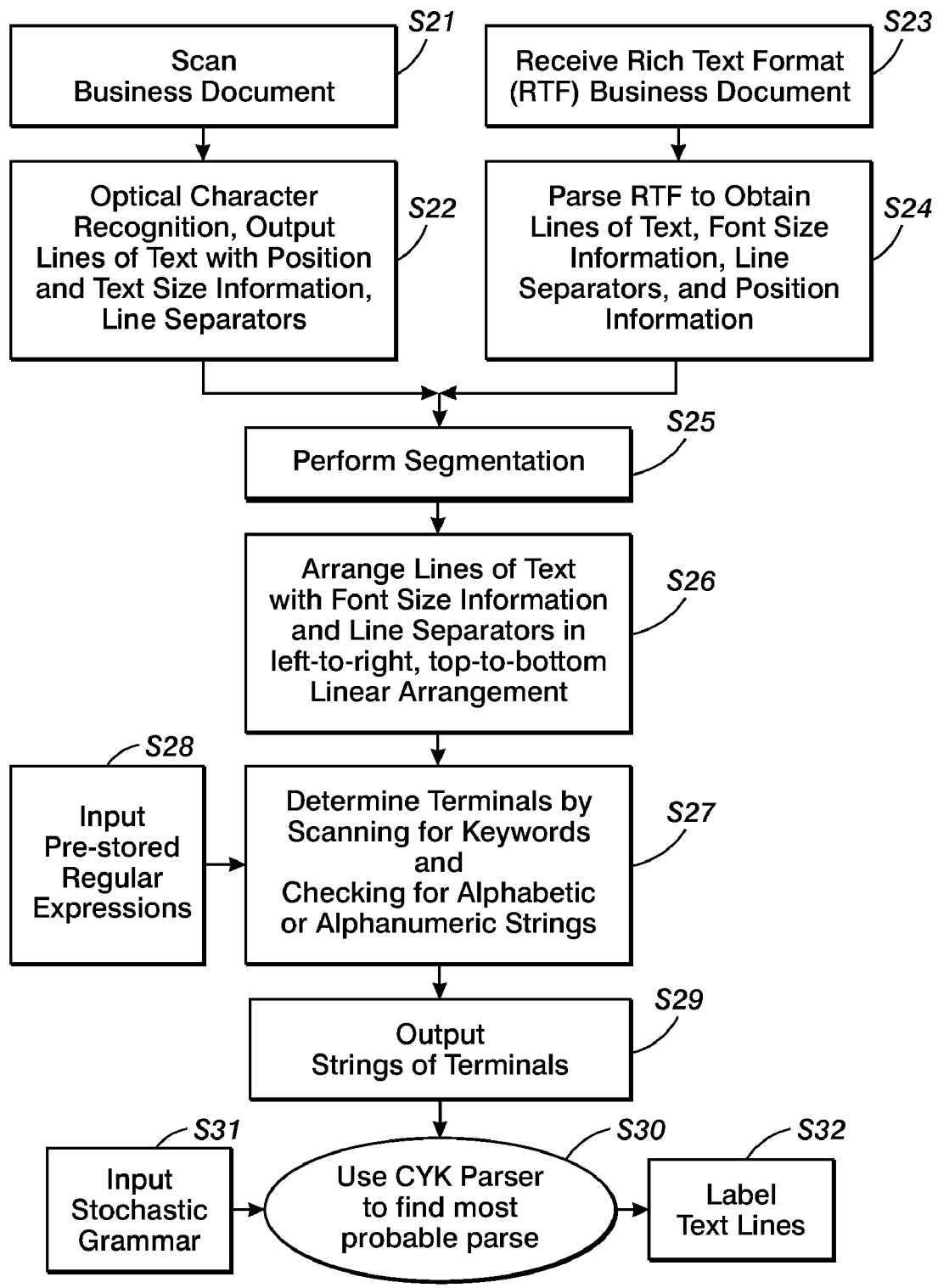
FIG. 4 illustrates a flowchart for recognizing the contents of a business document.

As illustrated in FIG. 4, a business document can be received in two formats, either as a hardcopy document or a rich text format document.

If the business document is a hardcopy document, the hardcopy document is scanned to create a bitmap image thereof at step S21. Thereafter, a conventional optical character recognition routine is carried out, at step S22, to produce lines of text, position information, text size information, and line separators.

If the business document is an electronic document, the rich text format document is received at step S23. Thereafter, the rich text format document is parsed, at step S24, to produce lines of text, position information, text size information, and line separators.

The lines of text, position information, text size information, and line separators are segmented at step S25, and then arranged into lines of text with font size information and line separators in left-to-right, top-to-bottom linear arrangement, at step S26. The lines of text are scanned, at step S27, using a predetermined set of regular expressions (S28), to determine terminals. Moreover, at step S27, the lines of text are checked for alphabetic strings or alphanumeric strings.

The outputted strings of terminals (S29) are processed to find the most probable parse using a CYK algorithm and a stochastic grammar or a stochastic context-free grammar. Thereafter, the lines of text are labeled at step S32.

For the purposes of recognition, the following business letter region classes may be used: "Dateline," "Signor" (Signor's identification), "InsideAddress" (addressee information), "Letterhead" (Name, Titles of sender), "Opening," "LetterheadContactInformation" (contact information of sending organization), "BodyText," "Closing," "TagLine" (this includes all labeled regions, e.g. To:, P.S., Enclosure, cc:, identification line, etc.), and "Other" (anything else).

With the exception of identification lines which have a fairly fixed format, the classification, "TagLines," is defined by a region having a tag at the beginning of the region, followed by what for now is considered to be free text. It is easier to model these region types, regions having a tag at the beginning, together rather than separately, as increasing the number of region classifications increases the number of parameters that must be trained in the stochastic context-free grammar. Given how inconsistently the regions appear and their common structure, the regions may be grouped. Also, the letterhead regions may be separated which simply name or describe an organization in text from letterhead 'contact' regions, which contain contact information for the organization of the sender. The text content of these regions is quite different, so the regions are treated as separate classes.

The input to the business letter recognition system may be optical character recognition output produced from a scan of a hard copy business letter. In the optical character recognition output, both words and text lines have been segmented. Graphics are removed from the optical character recognition output. The text line segmentation is refined. If a significant gap is located in a vertical projection and text lines are intersected by this gap, gaps greater than a threshold size are cut in half to produce two columns of text lines.

The input to the business letter recognition system may be an electronic rich text format document that has been generated by conventional methods or means. The electronic rich text format document is parsed/segmented to obtain to produce lines of text, position information, text size information, and line separators. As in the above implementation, the parsing/segmentation process is refined such that if a significant gap is located in a vertical projection and text lines are intersected by this gap, gaps greater than a threshold size are cut in half to produce two columns of text lines.

After text lines segmentation has been refined, both implementations merge and page regions are segmented using a variant of Nagy and Seth's XY-cut algorithm. The modified XY-cut algorithm may be two parameters, one defining the size of significant gaps in the horizontal direction (column separators) and another defining significant gaps in the vertical direction (row/paragraph separators). Bounding boxes are projected onto one axis. The axis is cut at gaps with a width greater than or equal to the threshold corresponding to the projection direction. The modified XY-cut algorithm is then applied, recursively, in any new sub regions produced after cutting. This second application of the modified XY-cut algorithm projects onto and then cuts along the opposite axis. The modified XY-cut algorithm terminates when no further cuts can be made in either the X or Y direction in a region.

In one implementation, cutting begins in the vertical direction so as to cut columns first. The tree resulting from the modified XY-cut algorithm is linearized using a depth-first traversal. This results in a top-down, left-to-right ordering of regions in the output.

The output is an array of objects including text lines, separators (representing cuts) and "region" objects, which have the bounding box of a region associated with them. Labeled cuts are explicitly made, where the direction of cutting is indicated. On the other hand, all cuts may be treated as the same type. The effect is a linearized layout of the business letter page regions.

After regions have been segmented and linearly laid out, text lines are classified in two ways. First, a lexical type is assigned based on an ordered set of regular expressions corresponding to the defined lexical types. Six text line lexical types may be used: date, open/close, contact, tagged\_line, name, and other (all other patterns). Two additional simple lexical types are also used to label separator and region objects, for use in the grammar.

Lexical types may be further refined using probabilistic classification. For example, region objects of type 'rlabel' may be subdivided into their specific region types, so that region objects may be divided into 'rlabelBODY_TEXT', 'rlabelINSIDE_ADDRESS', etc. types. This probabilistic classification is generally the method described above with respect to the business card recognition system, in which alphanumeric lines were divided into three classes based on font size.

It is noted that, for simplicity, all feature distributions can be univariate and normal. Region objects can be classified by the width of their associated regions in characters (e.g. by widest text line), and 'other' tokens can be classified by the ratio of alphabetic characters to the length of a text line in characters.

A stochastic context-free grammar is used to model the type and sequence of text lines within functional regions (e.g., Dateline, InsideAddress), and the sequence of regions in a business letter (e.g., An opening is followed by body text). Stochastic context free grammars have probabilities associated with their productions. To be well-defined the probabilities of all rules associated with each non-terminal must sum to one.

The maximum-likelihood derivation of an input string is computed using a variant of the Cocke-Younger-Kasami (CYK) parsing algorithm. The resulting derivation and probability are equivalent to the maximum inside probability of the grammar start symbol, the most probable parse tree given a stochastic context-free grammar. The output of the CYK parse is the probability and parse tree for the maximum likelihood derivation. In the tree, the region types assigned to text line sequences are represented as non-terminals in the tree. A list of recognized regions is produced by linearizing sub-tress rooted at non-terminals corresponding to region types. The resulting list of regions contains the assigned region type and text lines for each segmented region in the input.

It is noted that the linearized ordering of regions may have a great deal of variation both before and after the body text of a business letter. To accommodate this variation, the stochastic context-free grammar describes a model where a non-empty set of regions are at the top of the letter, followed by body text regions, and then a non-empty set of regions at the bottom of the letter. The regions that can appear above the body text and below differ, in that the dateline, opening and inside address of a letter always precede body text, while the closing and signor identification always follow body text.

Figure 5:
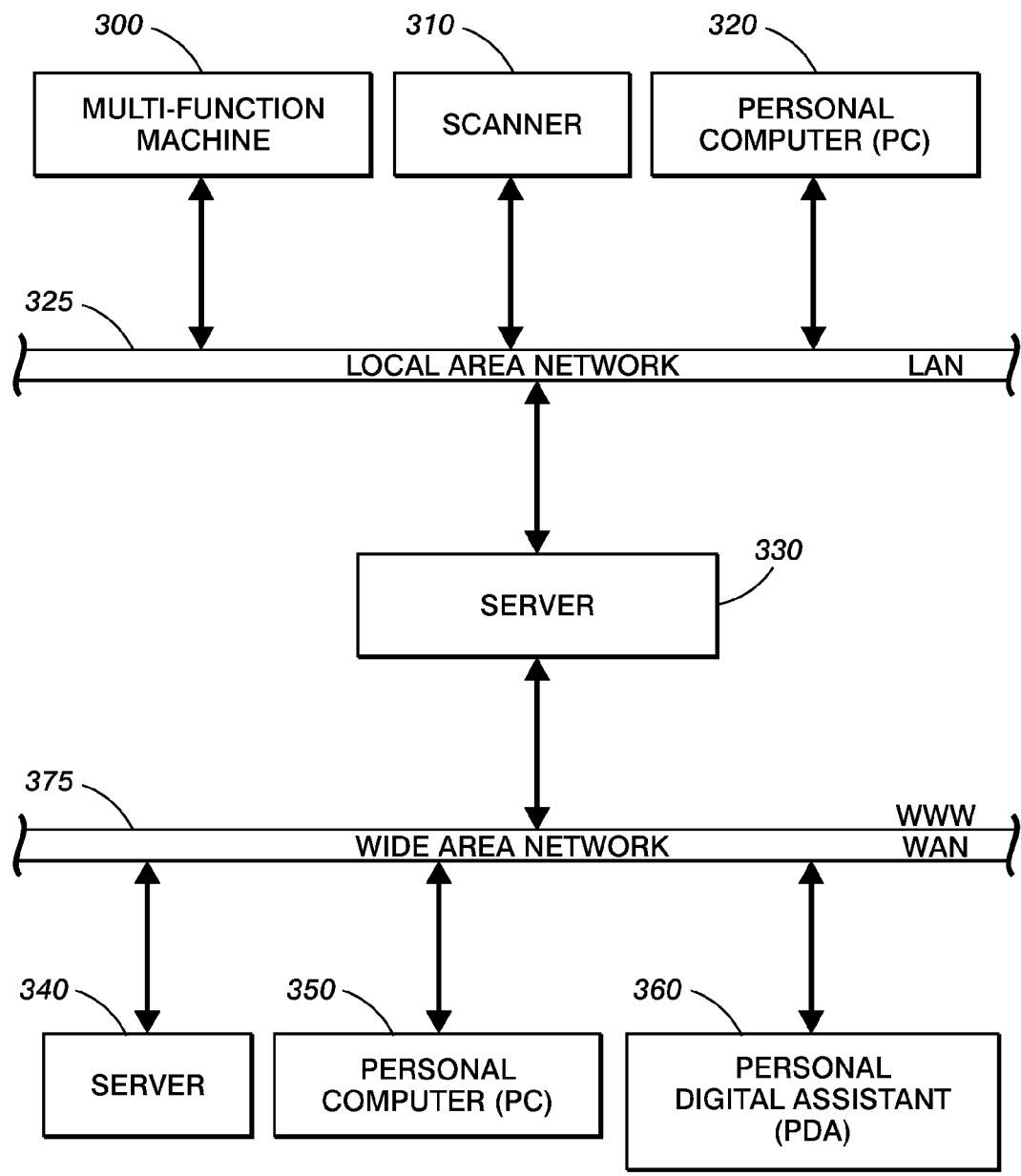
FIG. 5 is a block diagram of a system for recognizing the contents of a business document or business card and forwarding information to a desired destination.

As noted above, as illustrated in FIG. 5, an overall system can receive a business document in two formats, either as a hardcopy document or a rich text format document. As illustrated in FIG. 5, if the business document is a hardcopy document, the hardcopy document is scanned, by either a networked multifunction machine 300 having a digital scanner component or a networked digital scanner 310, to create a bitmap image thereof. Thereafter, a conventional optical character recognition routine is carried out by either the networked multifunction machine 300 (if the functionality resides on the networked multifunction machine 300), the networked digital scanner 310 (if the functionality resides on the networked digital scanner 310), a network server 330, or by a networked personal computer 320 (if the functionality resides on the networked personal computer 320). The conventional optical character recognition routine produces lines of text, position information, text size information, and line separators. It is noted that the networked multifunction machine 300, networked digital scanner 310, network server 330, and networked personal computer 320 may all be members of a local area network 325.

If the business document is an electronic document, the rich text format document may be generated by the networked personal computer 320. Thereafter, the rich text format document is parsed by either the network server 330 or networked personal computer 320 (if the functionality resides on the networked personal computer 320), to produce lines of text, position information, text size information, and line separators.

The remaining routines may be carried out by the network server 330 or networked personal computer 320 (if the functionality resides on the networked personal computer 320). The network server 330 uses the routing information distilled by the business letter/card recognition system to forward or route the desired electronic documents to their appropriate destinations; such as a network server 340, a network personal computer 350, or a networked enabled personal digital assistant 360 (the personal digital assistant 360 may also be enabled through a personal computer); through a wide area network or world wide web 375.

Figure 6:
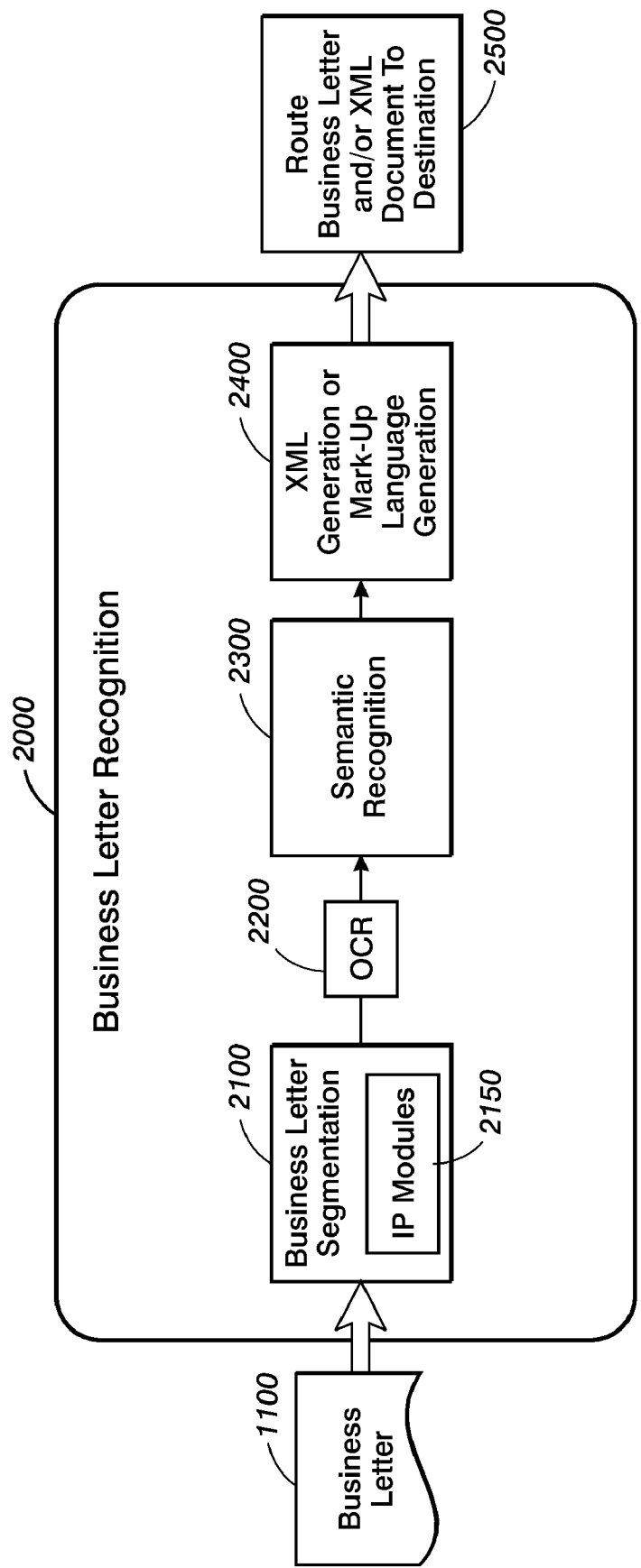
FIG. 6 is a block diagram of a business letter recognition system.

As illustrated in FIG. 6, the digital bitmap 1100 of the scanned business letter is received by a business letter recognition system or processor 2000. FIG. 7 illustrates an example of a typical business letter 1100 that has been scanned. The business letter recognition system or processor 2000 includes a business letter segmentation subsystem or module 2100 that may include an image processing module 2150 to process the bitmap. Examples of such processes are anti-aliasing, edge enhancement, deskewing, etc.

After the business letter has been processed by the business letter segmentation subsystem or module 2100, the business letter is processed by an optical character recognition process in optical character recognition subsystem or module 2200. The optical character recognition process may be any conventional optical character recognition process. The optical character recognition process performed by the optical character recognition subsystem or module 2200 converts each business letter bitmap into a business letter record of text data.

The business letter record of text data is subsequently processed by a semantic recognition subsystem or module 2300. The actual semantic recognition process has been discussed above. The semantic recognition subsystem or module 2300 outputs a plurality of fields of text data with labels to identify the nature of the text data within the fields, the labels being, for example, name, title, organization name, address, phone number, etc. An example of the output from the semantic recognition subsystem or module 2300 in accordance with processing a business letter record of text data corresponding to the letter illustrated in FIG. 7, a data file 1115, as illustrated in FIG. 8, having a plurality of fields of text data with labels to identify the nature of the text data within the fields, the labels being, for example, dateline, inside_address, opening, body_text, closing, signor, tag_line, etc.

The following list contains a list of possible tokens and rules for a grammar. It is noted that terminal symbols are named using lower-case alphabets and non-terminal symbols are named using upper-case. In the grammar section, the number preceding each production denotes the probability of the production being applied in the derivation of a terminal string when the non-terminal on the left hand side is encountered.

Tokens
  separator
    "separator"
    "row_cut.*"
    "column_cut.*"
  rlabel
    "\[REGION\]"
  date
    "[[:alpha:]]+[[:space:]]+[[:digit:]]{1,2}[[:punct:]][[:space:]]*[[:digit:]]{2,4}"
    "[[:alpha:]]+\s*[[:digit:]]{1,2},\s*[[:digit:]]{2,4}"
    "[[:digit:]]{2,2}[[:punct:]]+[[:digit:]]{2,2}[[:punct:]]+[[:digit:]]{2,4}"
  open_close
    "Sincerely[[:punct:]]+"
    "Yours\s[t,T]ruly[[:punct:]]+"
    "Dear\s.*"
    ".*,"
    ".*:"
  contact
    "P\.O\.\s+Box.*"
    "P\.O\..*"
    "PO\sBox.*"
    "PO\sBOX.*"
    "Post\s+Office\s+Box\s+\d+"
    "\d+.+AVE"
    "\d+.+STREET"
    "\d+.+Ave"
    "\d+.+Street"
    "\d+.+BLVD"
    "\d+.+Blvd"
    "\d+.+Rd[[:punct:]]?"
    "\d+.+RD[[:punct:]]?"
    "\d+.+Road"
    "\d+.+ROAD"
    "\d+.+Floor"
    "\d+.+FLOOR"
    "\d+.+BUILDING"
    "\d+.+Building"
    "\d+.+Drive"
    "\d+.+DRIVE"
    "\d+.+Park"
    "\d+.+Parkway"
    "\d+.+PARKWAY"
    ".*Suite\s\d+"
    "[[:alpha:]][:space:][:punct:]]+(\d){5,5}"
"[[:alpha:]][:space:][:punct:]]+(\d){5,5}[[:punct:][:space:]]+[[:digit:]]+[[:space:]]*(USA)?"
"\d+.*[[:alpha:]][:space:][:punct:]]+(\d){5,5}[[:punct:][:space:]]+[[:digit:]]+[[:space:]]*(USA)?"
    "\d+.*(\d){5,5}"
    "Box\s.*"
    "BOX\s.*"
    "[[:alpha:][:digit:]]+@([[:alpha:][:digit:]]+\.)+[[:alpha:][:digit:]]+"
    "email.*"
    "e-mail.*"
    "EMAIL.*"
    "Email.*"
    "E-MAIL.*"
    "www\.[[:alpha:][:punct:][:digit:]]+"
    "http:[[:alpha:][:punct:][:digit:]]+"
    "\([[:digit:]]{3,3}\)[[:digit:][:space:][:punct:]]+"
    "\([[:digit:][:space:]]+\)[[:digit:][:space:][:punct:]]+"
    "[[:digit:]]{3,3}[[:punct:][:space:]]*[:digit:]{3,3}[[:space:][:punct:]]+[:digit:]+"
    "Telephone.*"
    "TELEPHONE.*"
    "Fax.*"
    "FAX.*"
    ".*\s*ext[[:punct:]]?[[:space:]]*\d+"
    ".*\s*EXT[[:punct:]]?[[:space:]]*\d+"
    "1[[:digit:][:space:][:punct:]]{6,}"
    "Phone.*"
    "Manager.*"
    ".*Manager"
    "President.*"
    "Chief.*"
    ".*Director"
    ".*Coordinator"
    "Coordinator.*"
    "Director[[:punct:]]+.*"
    "Editor.*"
    ".*Editor"

-continued

```
        ".*INC[[:punct:]]+"
        ".*\s*Inc"
        ".*\s*INC"
        ".*\sINCORPORATED"
        ".*\sIncorporated"
        ".*\sLTD[[:punct:]]*"
        ".*\sLimited"
        ".*\sUniversity"
        ".*\sUNIVERSITY"
        "University.*"
        "UNIVERSITY.*"
        ".*\sCorp[[:punct:]]*"
        ".*\sCORP[[:punct:]]*"
        ".*\sCorporation"
        ".*\sCORPORATION"
        "Department.*"
        "ASSOCIATION.*"
        "Association.*"
        ".*\sAssociation"
        ".*\sASSOCIATION"
        "College.*"
        ".*\sCollege"
tagged_line
        "[[:alpha:]]+[:space]*.*"
        "[[:upper:][:space:]]+:.*"
        ".*([:space:]*[:alpha:]{2,3}[:space:]*:)+[:space:]*[:alpha:]{2,3}.*"
        "([[:alpha:]]{2,3}[:space:]*[:,/])+[[:space:]]*[[:alpha:]]{2,3}"
        "cc:.*"
        "CC:.*"
        "From:.*"
        "FROM:.*"
        "To:.*"
        "TO:.*"
        "Attention:.*"
        "ATTENTION:.*"
        "Attn:.*"
        "ATTN:.*"
        "P\.S\..*"
        "PS.*"
        "Enclosure.*"
        "Encl[[:punct:]]+.*"
        "re:.*"
        "RE:.*"
        "Re:.*"
name
        "Dr\..*"
        "Mr\..*"
        "Mrs\..*"
        "Ms\..*"
        "[[:alpha:]]+[[:space:]]+([[:alpha:]][[:punct:]][[:space:]]*)?[[:alpha:]]+"
other_text
        ".*"
End Tokens
Grammar
 0:  0.98774   S -> TOP_SEQ NT002
 1:  0.78703   TOP_SEQ -> TOP TOP_SEQ
 2:  0.76172   BOTTOM_SEQ -> BOTTOM BOTTOM_SEQ
 3:  0.10738   TOP -> / DATELINE
 4:  0.07347        | / INSIDE_ADDRESS
 5:  0.16787        | / OPENING
 6:  0.07234        | / LETTERHEAD
 7:  0.06871        | / LETTERHEAD_CONTACT
 8:  0.49597        | / OTHER_REGION
 9:  0.01426        | / TAG_LINE
10:  0.14101   BOTTOM -> / CLOSING
11:  0.06521        | / SIGNOR
12:  0.18704        | / LETTERHEAD
13:  0.03934        | / LETTERHEAD_CONTACT
14:  0.45733        | / OTHER_REGION
15:  0.11007        | / TAG_LINE
16:  0.65018   BODY -> / NT003
17:  0.34982        | / BODY_TEXT
18:  0.99999   / -> SEPARATOR RLABEL
19:  0.00001        | SEPARATOR /
20:  1.00000   *DATELINE -> date
21:  0.99351   *INSIDE_ADDRESS -> NAME CONTACT_SEQ
22:  0.00649        | OTHER CONTACT_SEQ
23:  1.00000   *OPENING -> open_close
24:  0.71867   *BODY_TEXT -> OTHER BODY_TEXT
25:  0.28054        | other_text
```

-continued

```
26: 0.00001    |   TAG_LINE BODY_TEXT
27: 0.00021    |   tagged_line
28: 0.00001    |   contact
29: 0.00056    |   CONTACT BODY_TEXT
30: 0.95469  *CLOSING -> open_close
31: 0.00001    |   OPEN_CLOSE NAME
32: 0.04530    |   OPEN_CLOSE OTHER
33: 0.06320  *SIGNOR -> name
34: 0.93516    |   NAME CONTACT_SEQ
35: 0.00163    |   contact
36: 0.00001    |   CONTACT CONTACT_SEQ
37: 0.54621  *LETTERHEAD -> OTHER LETTERHEAD
38: 0.45379    |   other_text
39: 0.27323  *LETTERHEAD_CONTACT -> CONTACT CONTACT_SEQ
40: 0.72676    |   OTHER CONTACT_SEQ
41: 0.00001    |   contact
42: 0.69442  *TAG_LINE -> tagged_line
43: 0.30558    |   TAGGED_LINE OTHER_REGION
44: 0.01084  *OTHER_REGION -> TAGGED_LINE OTHER_REGION
45: 0.40018    |   OTHER OTHER_REGION
46: 0.03955    |   CONTACT OTHER_REGION
47: 0.05118    |   OPEN_CLOSE OTHER_REGION
48: 0.00001    |   DATE OTHER_REGION
49: 0.06137    |   NAME OTHER_REGION
50: 0.00816    |   tagged_line
51: 0.31004    |   other_text
52: 0.05332    |   contact
53: 0.02754    |   open_close
54: 0.00065    |   date
55: 0.03717    |   name
56: 0.25949  CONTACT_SEQ -> CONTACT CONTACT_SEQ
57: 0.34269    |   contact
58: 0.24990    |   OTHER CONTACT_SEQ
59: 0.14792    |   other_text
60: 1.00000  SEPARATOR -> separator
61: 1.00000  RLABEL -> rlabel
62: 1.00000  OTHER -> other_text
63: 1.00000  OPEN_CLOSE -> open_close
64: 1.00000  TAGGED_LINE -> tagged_line
65: 1.00000  CONTACT -> contact
66: 1.00000  DATE -> date
67: 1.00000  NAME -> name
68: 1.00000  S -> TOP NT002
69: 0.21297  TOP_SEQ -> TOP TOP
70: 0.01226  S -> TOP_SEQ NT004
71: 0.23828  BOTTOM_SEQ -> BOTTOM BOTTOM
72: 1.00000  S -> TOP NT004
73: 1.00000  NT002 -> BODY BOTTOM_SEQ
74: 1.00000  NT003 -> BODY_TEXT BODY
75: 1.00000  NT004 -> BODY BOTTOM
```

The labeled fields of text data are received by an electronic business letter generation subsystem or module 2400. The electronic business letter generation subsystem or module 2400 converts the labeled fields of text data into an extensible marked-up language (XML) document or marked-up language document that can be readily used by various document management applications 2500 to route the scanned business letter to the desired business destination.

Figure 9:
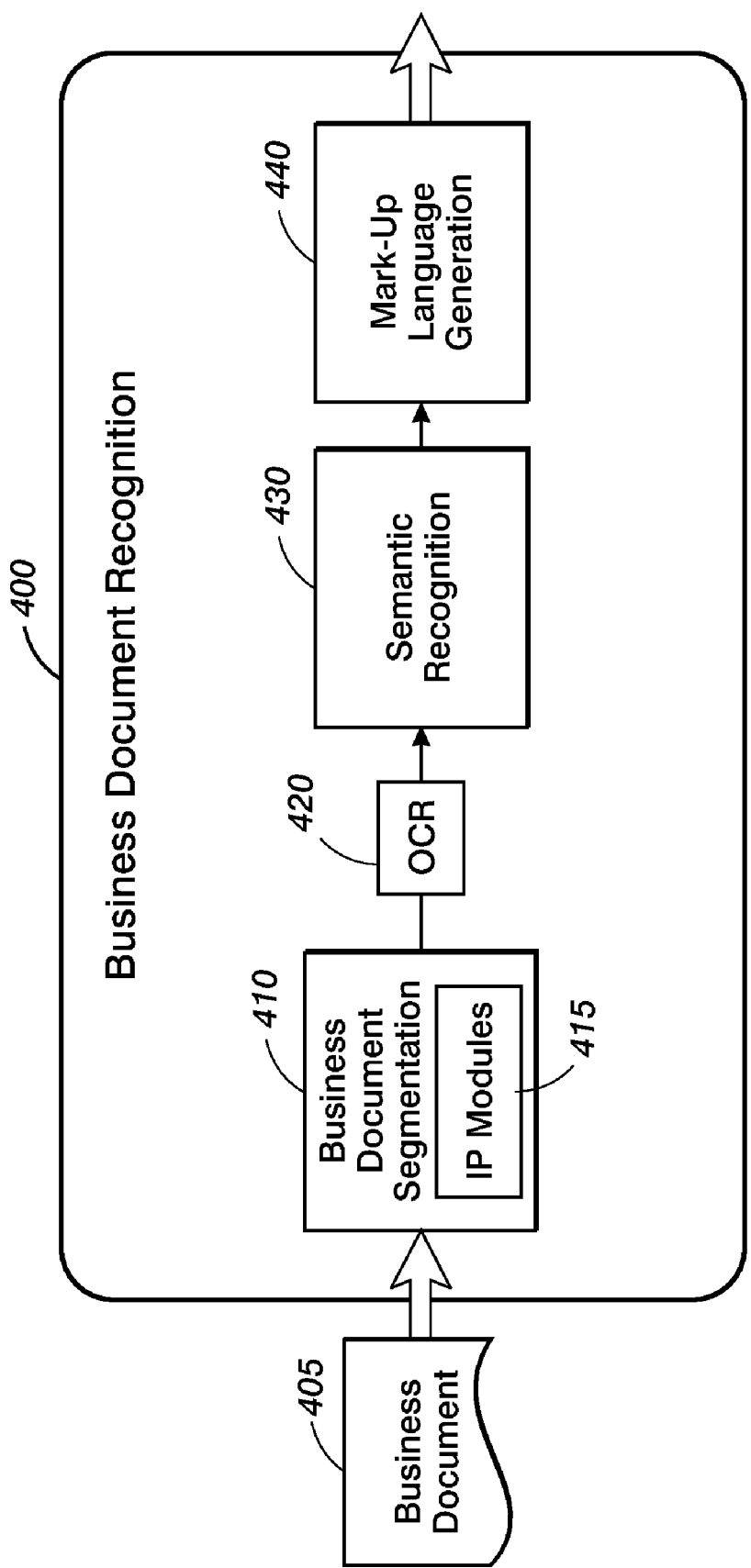
FIG. 9 is a block diagram of a business document recognition system.

As illustrated in FIG. 9, the digital bitmap 405 of a business document is received by a business document recognition system or processor 400. The business document recognition system or processor 400 includes a business document segmentation subsystem or module 410 that segments or parses out, if the business document is represented by a plurality of business cards, each individual business card from the overall digital bitmap 405 into individual business card digital bitmaps. The business document segmentation subsystem or module 410 may include an image processing module 415 to process the bitmap. Examples of such processes are anti-aliasing, edge enhancement, deskewing, etc.

Thereafter, each business document bitmap is processed by an optical character recognition process in optical character recognition subsystem or module 420. The optical character recognition process may be any conventional optical character recognition process. The optical character recognition process performed by the optical character recognition subsystem or module 420 converts each business document bitmap into a business document record of text data.

The business document record of text data is subsequently processed by a semantic recognition subsystem or module 430. The actual semantic recognition process will be discussed in more detail below. The semantic recognition subsystem or module 430 outputs a plurality of fields of text data with labels to identify the nature of the text data within the fields.

The labeled fields of text data are received by an electronic marked-up language generation subsystem or module 440. The electronic marked-up language subsystem or module 440 converts the labeled fields of text data into a text file that can be readily used by various business contact management or document management applications to import the desired business information in a useable format or to route the business documents to the proper destination.

In summary, a system or methodology provides for distilling information from an electronic business document, a hardcopy business document, or a hardcopy business card to determine routing information for forwarding of electronic relating to the electronic business document, hardcopy business document, or hardcopy business card to a destination. The destination, with respect to the business document, may be associated with an addressor and addressee of the business document. On the other hand, the destination, with respect to the business card, may be associated with a recipient of the business card or with identification information on the business card.

While various examples and embodiments have been shown and described, it will be appreciated by those skilled in the art that the spirit and scope of the descriptions are not limited to the specific description and drawings herein, but extend to various modifications and changes.

What is claimed is:

1. A method of distilling information from a hard copy business card to generate a structured electronic file having the distilled information therein, comprising:
    (a) electronically scanning a platen area of a network citizen, having a business card thereon, to create a bitmap of the scanned platen area;
    (b) transferring the bitmap of the scanned platen area to a network processor;
    (c) segmenting the bitmap of the scanned platen area, using the network processor, into a bitmap object, the bitmap object corresponding to the scanned business card;
    (d) converting, using the network processor, the bitmap object into a block of text;
    (e) processing, using the network processor, the block of text to generate a structured representation of semantic entities corresponding to the scanned business card; and
    (f) converting, using the network processor, the structured representation into a structure text file.

2. The method as claimed in claim 1, further comprising:
    (g) electronically mailing the structure text file to a user-designated address.

3. The method as claimed in claim 1, further comprising:
    (g) image processing the bitmap of the scanned platen area, using the network processor, prior to segmentation.

4. The method as claimed in claim 1, wherein the structure text file is structure text file with a vcf extension.

5. The method as claimed in claim 1, wherein the structure text file is structure text file with a rix extension.

6. The method as claimed in claim 1, wherein a plurality of business cards located on the platen area of a network citizen are electronically scanned to create a single bitmap of the a bitmap of the scanned platen area, the bitmap of the scanned platen area, using the network processor, is segmented into a plurality of bitmap objects, each bitmap object corresponding to an electronically scanned business card, each bitmap object is converted into a block of text wherein each block of text corresponds to an electronically scanned business card, each block of text is processed to generate a structured representation of semantic entities wherein each structured representation corresponds to electronically scanned business card, and each structured representation is converted into a structure text file such that a structure text file is generated for each electronically scanned business card.

7. The method as claimed in claim 6, further comprising:
    (g) electronically mailing each structure text file to a user-designated address.

8. The method as claimed in claim 6, wherein each structure text file is structure text file with a vcf extension.

9. The method as claimed in claim 6, wherein each structure text file is structure text file with a rix extension.

10. A system for distilling information from a hard copy business card to generate a structured electronic file having the distilled information therein, comprising:
    a network citizen having a platen area, said network citizen electronically scanning the platen area, having a business card thereon, to create a bitmap of the scanned platen area; and
    a network processor, operatively connected to said network citizen, said network processor segmenting the bitmap of the scanned platen area, received from said network citizen, into a bitmap object, the bitmap object corresponding to the scanned business card;
    said network processor converting the bitmap object into a block of text and processing the block of text to generate a structured representation of semantic entities corresponding to the scanned business card;
    said network processor converting the structured representation into a structure text file.

11. The system as claimed in claim 10, wherein said network processor electronically mails the structure text file to a user-designated address.

12. The system as claimed in claim 10, wherein the structure text file is structure text file with a vcf extension.

13. The system as claimed in claim 10, wherein the structure text file is structure text file with a rix extension.

14. The system as claimed in claim 10, wherein said network citizen electronically scans a plurality of business cards located on the platen area to create a single bitmap of the a bitmap of the scanned platen area;
    said network processor segments the bitmap of the scanned platen area into a plurality of bitmap objects, each bitmap object corresponding to an electronically scanned business card;
    said network processor converts each bitmap object into a block of text, each block of text corresponding to an electronically scanned business card;
    said network processor processes each block of text to generate a structured representation of semantic entities wherein each structured representation corresponds to electronically scanned business card; and
    said network processor converts each structured representation into a structure text file such that a structure text file is generated for each electronically scanned business card.

15. The system as claimed in claim 10, wherein said network citizen is a network scanner.

16. The system as claimed in claim 10, wherein said network citizen is a network multi-function device.

17. The system as claimed in claim 10, wherein said network processor is a network server.

18. A system for retrieving information from a hard copy business card to generate a structured electronic file having the retrieved information therein, comprising:
    a network scanning means, having a platen area, for electronically scanning the platen area, having a business card thereon, to create a bitmap of the scanned platen area; and
    a network server operatively connected to said network scanning means;
    said network server including,
        segmentation means for segmenting the bitmap of the scanned platen area, received from said network scanning means, into a bitmap object, the bitmap object corresponding to the scanned business card,
        bitmap to text converter means, operatively connected to said segmentation means, for converting the bitmap object into a block of text, semantic means, operatively connected to said bitmap to text converter means, for processing the block of text to generate a structured representation of semantic entities corresponding to the scanned business card, and card generation means, operatively connected to said bitmap to text converter means, for converting the structured representation into a structure text file.

19. The system as claimed in claim 18, wherein said network server further includes mail means for electronically mailing the structure text file to a user-designated address.

20. The system as claimed in claim 18, wherein said network scanning means electronically scans a plurality of business cards located on the platen area to create a single bitmap of the a bitmap of the scanned platen area;

said segmentation means segments the bitmap of the scanned platen area into a plurality of bitmap objects, each bitmap object corresponding to an electronically scanned business card;

said bitmap to text converter means converts each bitmap object into a block of text, each block of text corresponding to an electronically scanned business card;

said semantic means processes each block of text to generate a structured representation of semantic entities wherein each structured representation corresponds to electronically scanned business card; and said card generation means converts each structured representation into a structure text file such that a structure text file is generated for each electronically scanned business card.

* * * * *